(12) United States Patent
Kobayashi et al.

(10) Patent No.: US 11,466,440 B2
(45) Date of Patent: Oct. 11, 2022

(54) TOILET DEVICE AND TOILET SYSTEM

(71) Applicant: TOTO LTD., Kitakyushu (JP)

(72) Inventors: Motoki Kobayashi, Kitakyushu (JP); Shoichi Tsuiki, Kitakyushu (JP); Yuya Masahira, Kitakyushu (JP); Hirofumi Nagatomi, Kitakyushu (JP); Yasuo Nambu, Kitakyushu (JP)

(73) Assignee: TOTO LTD., Fukuoka (JP)

( * ) Notice: Subject to any disclaimer, the term of this patent is extended or adjusted under 35 U.S.C. 154(b) by 366 days.

(21) Appl. No.: 16/888,981

(22) Filed: Jun. 1, 2020

(65) Prior Publication Data

US 2021/0062490 A1    Mar. 4, 2021

(30) Foreign Application Priority Data

Aug. 26, 2019 (JP) .............................. JP2019-153767

(51) Int. Cl.
 *E03D 5/10* (2006.01)
 *E03D 11/08* (2006.01)
(52) U.S. Cl.
 CPC .............. *E03D 5/105* (2013.01); *E03D 11/08* (2013.01); *E03D 2201/40* (2013.01)
(58) Field of Classification Search
 CPC .................................................. E03D 5/105
 USPC ............................................................ 4/420
 See application file for complete search history.

(56) References Cited

U.S. PATENT DOCUMENTS

| 10,697,166 B2 * | 6/2020 | Salemi Parizi ......... E03D 11/00 |
| 11,091,903 B2 * | 8/2021 | Grover ................ G01F 23/2962 |
| 2019/0153712 A1 | 5/2019 | Ichihara et al. |

FOREIGN PATENT DOCUMENTS

| CN | 108699826 A | 10/2018 |
| JP | 2004-285762 A | 10/2004 |
| JP | 2013-072221 A | 4/2013 |
| JP | 2013-072222 A | 4/2013 |

OTHER PUBLICATIONS

Decision to Grant for the corresponding Japanese Patent Application No. 2019-153767 dated Sep. 17, 2021.

* cited by examiner

*Primary Examiner* — Lauren A Crane
(74) *Attorney, Agent, or Firm* — Pearne & Gordon LLP (57) ABSTRACT

According to the embodiment, a toilet device includes a detector and a controller. The detector is detecting whether or not flush water is at a position lower than a full level and higher than a seal level at a surface of a bowl of a flush toilet. The controller is determining a clog state of the flush toilet based on a detection result of the detector after a flush water supplier is closed. The flush water supplier is located in a flow channel discharging flush water into the bowl. The position of the detection region of the detector at the surface of the bowl is separated from flush water flowing in a vertical direction from a water discharge port of the flow channel toward a bottom portion of the bowl after the flush water supplier is closed.

20 Claims, 8 Drawing Sheets

TOILET DEVICE AND TOILET SYSTEM

CROSS-REFERENCE TO RELATED APPLICATIONS

This application is based upon and claims the benefit of priority from Japanese Patent Application No. 2019-153767, filed on Aug. 26, 2019; the entire contents of which are incorporated herein by reference.

FIELD

Embodiments described herein relate generally to a toilet device and a toilet system.

BACKGROUND

Technology is known in which a clog determination of a flush toilet is performed based on water level information inside the flush toilet after flushing. According to this technology, the determination accuracy of clogging can be increased because the clog determination is performed in a state in which the water level inside the flush toilet is stable.

When the flush water supply valve is closed to end the flush water supply to the flush toilet, remaining water exists inside the pipe line at the downstream side of the flush water supply valve. The remaining water outflows into the flush toilet while its force gradually decreases over time. Accordingly, there are cases where it takes time for the remaining water inside the pipe line to drain completely into the flush toilet.

A microwave sensor or a capacitive sensor can be used as a sensor detecting water inside the flush toilet. In such a case, there is a possibility that a misdetection that the flush toilet is clogged may occur if the sensor detects the remaining water flowing over the surface of the bowl of the flush toilet. Accordingly, it is necessary for the sensor not to be able to start the clog detection until the drainage of the remaining water completely ends.

Therefore, the start timing of the clog detection by the sensor is delayed, and the end timing of the clog detection also is delayed by the same amount. Accordingly, for example, if a control is performed to prohibit the toilet flush until the clog detection ends, meanwhile, the user cannot perform the toilet flush, and there is a risk that the ease of use of the flush toilet may undesirably degrade.

SUMMARY

According to the embodiment, a toilet device includes a detector and a controller. The detector is detecting whether or not flush water is at a position lower than a full level and higher than a seal level at a surface of a bowl of a flush toilet. The controller is determining a clog state of the flush toilet based on a detection result of the detector after a flush water supplier is closed. The flush water supplier is located in a flow channel discharging flush water into the bowl. The position of the detection region of the detector at the surface of the bowl is separated from flush water flowing in a vertical direction from a water discharge port of the flow channel toward a bottom portion of the bowl after the flush water supplier is closed.

DETAILED DESCRIPTION

An embodiment of the invention is a toilet device including a detector detecting whether or not flush water is at a position lower than a full level and higher than a seal level at a surface of a bowl of a flush toilet, and a controller determining a clog state of the flush toilet based on a detection result of the detector after a flush water supplier is closed; the flush water supplier is located in a flow channel discharging flush water into the bowl; and a position of a detection region of the detector at the surface of the bowl is separated from flush water flowing in a vertical direction from a water discharge port of the flow channel toward a bottom portion of the bowl after the flush water supplier is closed.

Embodiments of the invention will now be described with reference to the drawings. Similar components in the drawings are marked with the same reference numerals, and a detailed description is omitted as appropriate.

Figure 1:
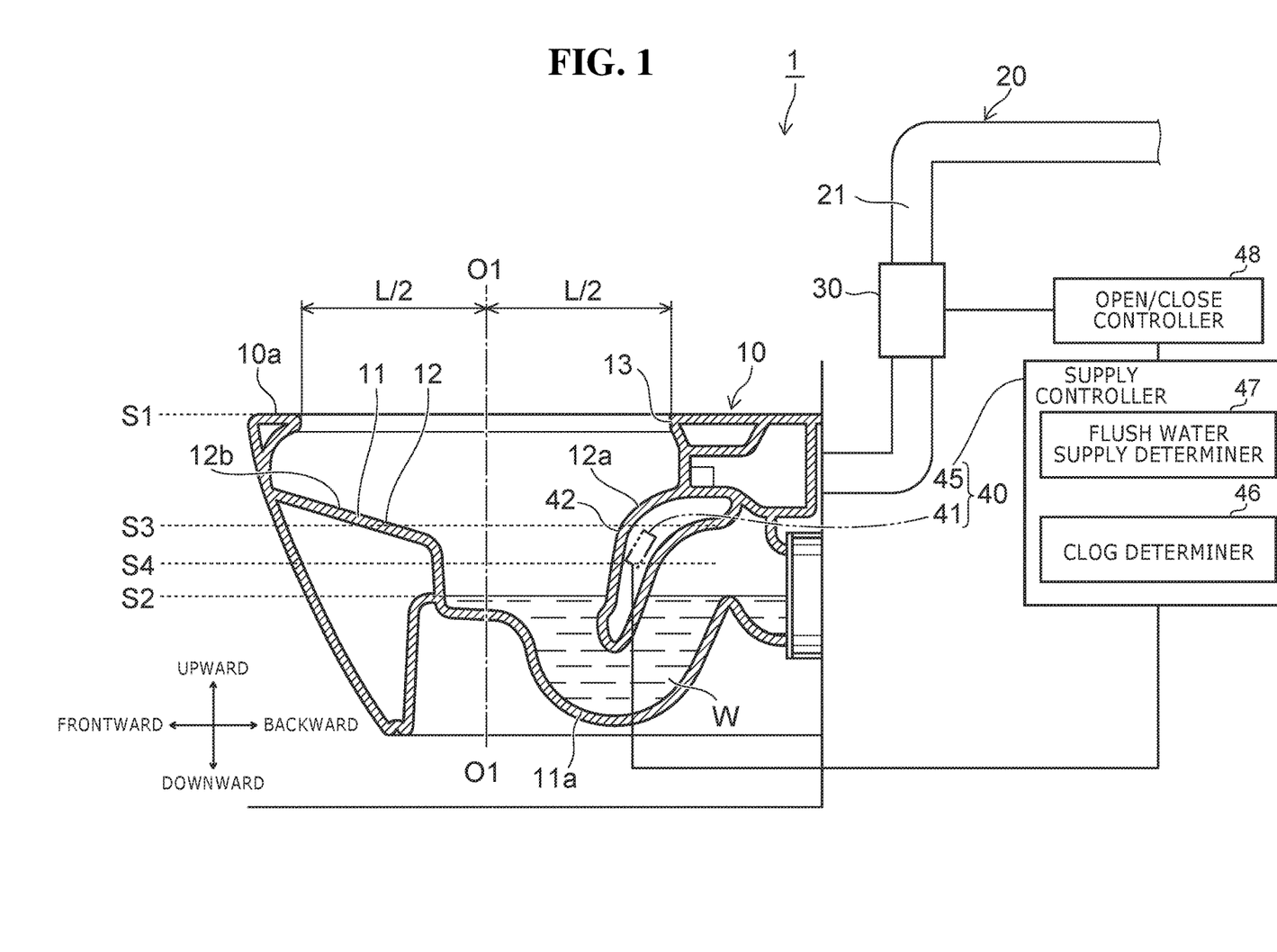
FIG. 1 is a schematic view showing a configuration of a toilet system according to an embodiment of the invention.

FIG. 1 is a schematic view showing a configuration of a toilet system according to an embodiment of the invention.

As shown in FIG. 1, the toilet system 1 according to the embodiment includes a flush toilet 10 including a bowl 11, a flush water supplier 30 supplying flush water W to the bowl 11, and a toilet device 40. In this specification, "upward", "downward", "frontward", "backward", "leftward", and "rightward" are directions when viewed by a user seated on the toilet seat of the flush toilet 10.

Figure 2A:
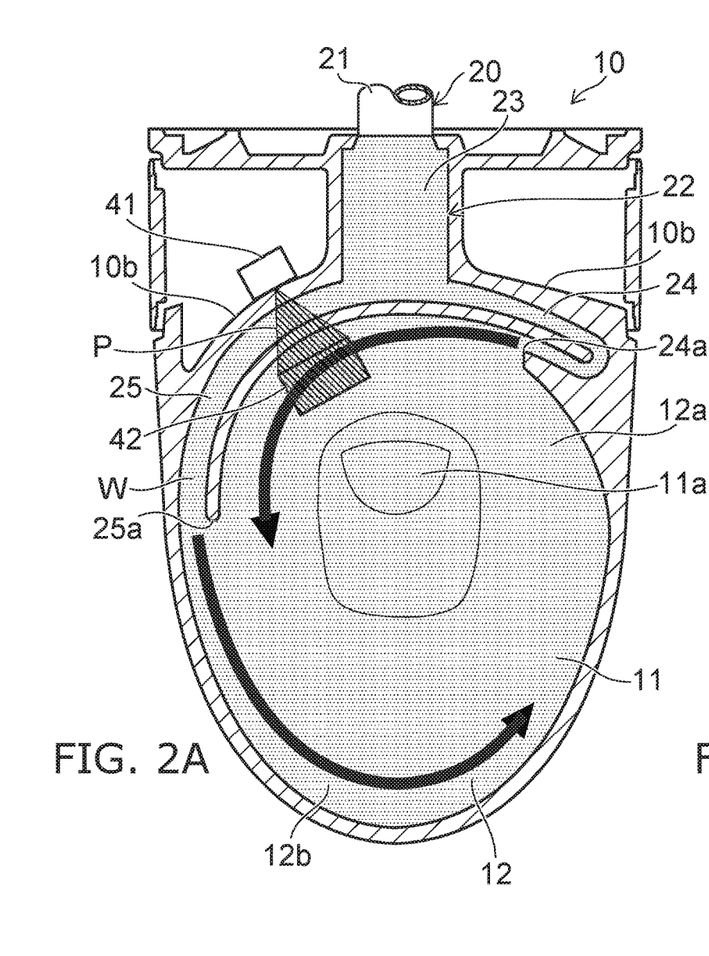
FIG. 2A is a cross-sectional view schematically showing the surface of the bowl when flushing.

FIG. 2A is a cross-sectional view schematically showing the surface of the bowl when flushing.

Figure 2B:
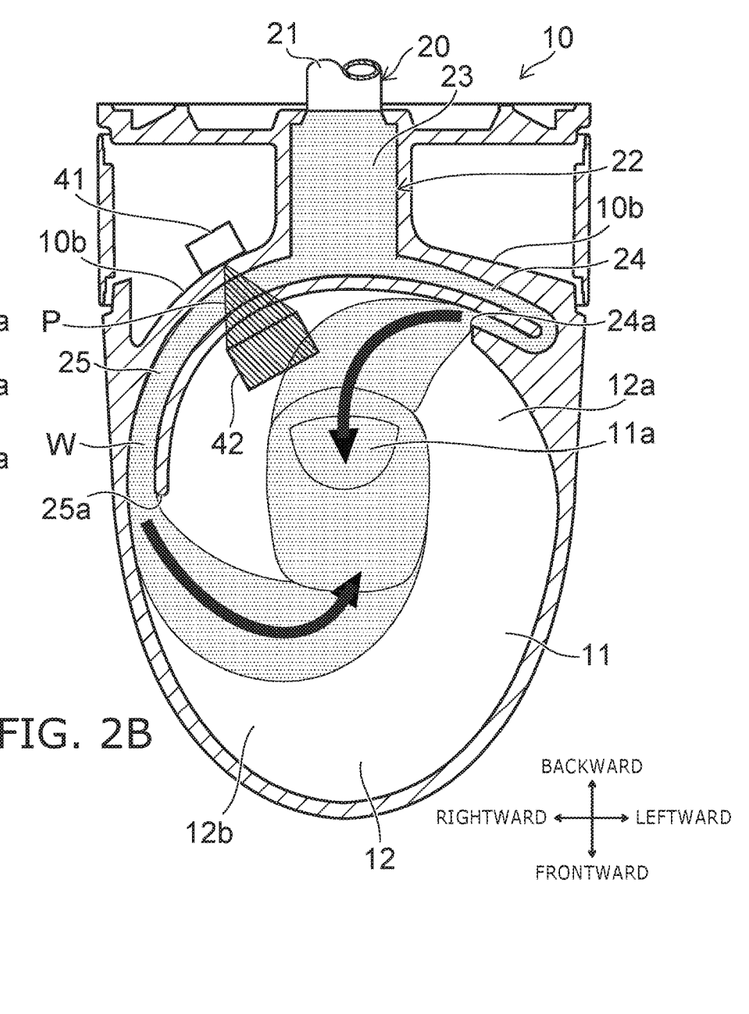
FIG. 2B is a cross-sectional view schematically showing the state directly after the flush water supplier is closed.

FIG. 2B is a cross-sectional view schematically showing the state directly after the flush water supplier is closed.

Figure 3A:
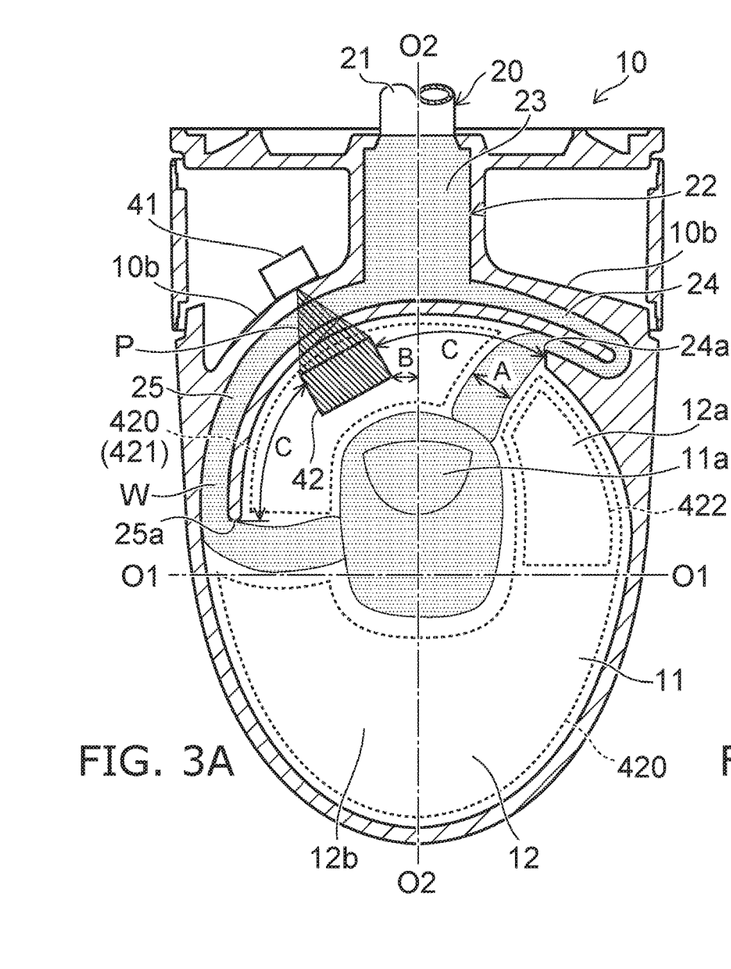
FIG. 3A is a cross-sectional view schematically showing the state at 10 seconds from when the flush water supplier is closed.

FIG. 3A is a cross-sectional view schematically showing the state at 10 seconds from when the flush water supplier is closed.

Figure 3B:
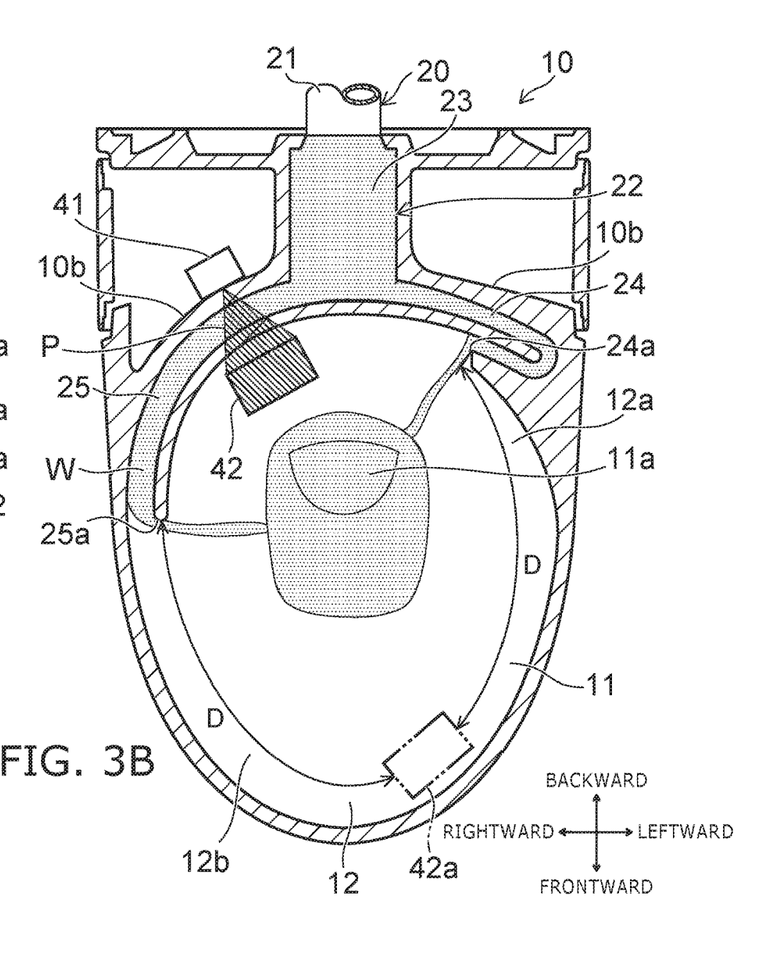
FIG. 3B is a cross-sectional view schematically showing the state directly before the flushing ends.

FIG. 3B is a cross-sectional view schematically showing the state directly before the flushing ends.

The flush toilet 10 is a so-called sit-down flush toilet, and a not-illustrated toilet seat is disposed on an upper surface 10a. The flush toilet 10 includes the concave bowl 11 recessed downward from the upper surface 10a. In other words, the inner end portion of the upper surface 10a of the flush toilet 10 forms an opening 13 of the bowl 11. The flush toilet 10 receives excrement such as urine, feces, etc., of the user into the bowl 11. When the user performs a toilet flush operation or rises from the toilet seat, a toilet flush is performed in which the flush water W is supplied from a flow channel 20, the excrement that is inside the bowl 11 is drained, and a surface 12 of the bowl 11 is washed. After the toilet flush ends, the flush water W (the seal water) accumulates at a bottom portion 11a of the bowl 11. A back side 12a of the surface 12 of the bowl 11 is formed more vertically than a front side 12b of the surface 12.

The flow channel 20 connects between the bowl 11 and a not-illustrated water supply source. The flush water W that is supplied to the bowl 11 flows through the flow channel 20. The flow channel 20 includes a water supply pipe line 21 extending from the water supply source to the flush toilet 10, and a flush water passageway 22 that is provided inside the flush toilet 10 and extends from the water supply pipe line 21 to the bowl 11.

The flush water passageway 22 is divided into two branches inside the flush toilet 10. Specifically, the flush water passageway 22 includes a main passageway 23 connected to the water supply pipe line 21, a first branch passageway 24 that extends in the clockwise direction (leftward) from the main passageway 23 and communicates with the surface 12 of the bowl 11, and a second branch passageway 25 that extends in the counterclockwise direction (rightward) from the main passageway 23 and communicates with the surface 12 of the bowl 11 at a different position from the first branch passageway 24.

The first branch passageway 24 has a first water discharge port 24a open toward the surface 12 of the bowl 11. On the other hand, the second branch passageway 25 has a second water discharge port 25a open toward the surface 12 of the bowl 11. The first water discharge port 24a and the second water discharge port 25a communicate with the surface 12 of the bowl 11 at different positions.

The first water discharge port 24a discharges the flush water W along the surface 12 of the bowl 11 from the left back side of the bowl 11. On the other hand, the second water discharge port 25a is separated from the first water discharge port 24a in the circumferential direction. The second water discharge port 25a discharges the flush water W along the surface 12 of the bowl 11 from the right side of the bowl 11. The first water discharge port 24a and the second water discharge port 25a discharge the flush water W so that the flush water W flows counterclockwise over the surface 12 of the bowl 11. In other words, the flush toilet 10 includes water discharge ports (the first water discharge port 24a and the second water discharge port 25a) that discharge the flush water W into the bowl 11 at two locations. The first water discharge port 24a and the second water discharge port 25a may be provided at other positions of the bowl 11 separated in the circumferential direction.

The flush water supplier 30 is located in the flow channel 20 discharging the flush water W into the bowl 11. Specifically, the flush water supplier 30 is located in the water supply pipe line 21 of the flow channel 20. The flush water supplier 30 includes, for example, an on-off valve that is opened and closed by a solenoid, a motor, etc., and is connected to a water supply source such as waterworks, a water storage tank, etc. The flush water supplier 30 includes, for example, a flush valve. The flush water supplier 30 is connected to an open/close controller 48, and the opening and closing of the flush water supplier 30 is controlled by a command signal from the open/close controller 48. Also, the flush water supplier 30 may include a tank storing water, a pump feeding water, etc., as appropriate.

When the user performs a flush operation for flushing the flush toilet 10 by using a not-illustrated remote control or the like, the open/close controller 48 transmits a signal corresponding to the flush operation to the flush water supplier 30. Based on the command signal (the open signal) transmitted from the open/close controller 48, the flush water supplier 30 switches from the closed state to the open state. Thereby, the flush water W is supplied from the water supply source to the flush toilet 10 via the flow channel 20.

The toilet device 40 includes a detector 41 provided in the flush toilet 10, and a supply controller 45 connected to the detector 41. For example, the detector 41 is mounted inside the flush toilet 10 or at the outer surface of the flush toilet 10 opposing the surface 12 of the bowl 11. As an example, the detector 41 is mounted in a storage space 10b of the flush toilet 10 by which the main passageway 23 of the flow channel 20 is sandwiched in the lateral direction.

The detector 41 detects whether or not the flush water W is in the bowl 11. Specifically, the detector 41 detects whether or not the flush water W is at a position lower than a full level S1 and higher than a seal level S2 at the surface 12 of the bowl 11 of the flush toilet 10. The full level S1 is the position at which the flush water W overflows from the bowl 11 and is the position of the upper surface 10a of the flush toilet 10. The seal level S2 is the position of the flush water W (the seal water) accumulated in the bottom portion 11a of the bowl 11 after the flushing of the flush toilet 10 has ended. A radio wave sensor, a capacitive sensor, or the like is used as the detector 41.

The radio wave sensor radiates a radio wave and detects the reflected wave. The intensity of the reflected wave changes according to the existence or absence of water at the position where the radio wave is radiated. When a radio wave sensor is used as the detector 41, the detector 41 is provided so that the radio wave is radiated in a prescribed region of the surface 12 of the bowl 11.

A capacitive sensor detects the electrostatic capacitance between the sensor and the prescribed region opposing the sensor. The electrostatic capacitance changes according to the existence or absence of water in the prescribed region. When a capacitive sensor is used as the detector 41, the detector 41 is provided to oppose the detection region of the surface 12 of the bowl 11.

By using a radio wave sensor or a capacitive sensor as the detector 41, it can be detected whether or not the water level inside the bowl 11 is at a position higher than the prescribed region. Also, the water level can be detected directly by disposing capacitive sensors consecutively at multiple locations at different heights.

In the example of the embodiment, a radio wave sensor is provided inside the flush toilet 10 (in the storage space 10b) as the detector 41. In the example, the detector 41 radiates a radio wave P and detects whether or not the flush water W is at a position lower than the full level S1 and higher than the seal level S2 at the surface 12 of the bowl 11. In other words, the detector 41 detects the state in which the flush water W has accumulated to a position higher than the seal level S2 due to clogging of the flush toilet 10. A detection method and a detection region 42 of the detector 41 are described below.

For example, the supply controller 45 is provided in the flush toilet 10. The supply controller 45 may be provided in a casing (not illustrated) placed on the upper surface 10a of the flush toilet 10 or may be provided outside the flush toilet 10 (e.g., in the toilet room). The supply controller 45 is included in the controller of the invention and determines the clog state of the flush toilet 10 based on the detection result of the detector 41 after the closing of the flush water supplier 30 located in the flow channel 20 discharging the flush water W into the bowl 11. The supply controller 45 is connected to the detector 41 and the open/close controller 48. Also, for example, the supply controller 45 is connected to a notification device (not illustrated) for notifying the clog state of the flush toilet 10.

The supply controller 45 includes a clog determiner 46 determining whether or not, based on the detection result of the detector 41, clogging has occurred in the flush toilet 10. Also, the supply controller 45 includes a flush water supply determiner 47 determining whether or not, based on the determination result of the clog determiner 46, the flush water W can be supplied to the bowl 11 of the flush toilet 10. The supply controller 45 transmits the determination result of the flush water supply determiner 47 to the open/close controller 48 controlling the open/close operation of the flush water supplier 30. The open/close controller 48 may be an integral body with the supply controller 45. The clog determiner 46, the flush water supply determiner 47, and the open/close controller 48 may be distinct controllers.

The clog determiner 46 of the supply controller 45 determines that clogging of the flush toilet 10 has occurred when the detector 41 detects the flush water W after a prescribed period of time has elapsed from when the flush water supplier 30 is closed. For example, the prescribed period of time can be set to an arbitrary number of seconds between 4 and 12 seconds, and favorably can be set to 10 seconds. More favorably, the prescribed period of time can be set to 5 seconds.

When the clog determiner 46 determines that clogging of the flush toilet 10 has occurred, the flush water supply determiner 47 determines that it is impossible to supply the flush water W to the bowl 11. The flush water supply determiner 47 determines that it is impossible to supply the flush water W to the bowl 11 from when the flush water supplier 30 is closed until the determination of the clog state of the flush toilet 10 ends. In other words, the flush water supply determiner 47 prohibits the open operation of the flush water supplier 30 from when the flush water supplier 30 is closed until the determination of the clog state of the flush toilet 10 ends. Accordingly, by setting the prescribed period of time to be as short as possible, the determination of the clog state of the flush toilet 10 can be ended early; therefore, the ease of use of the flush toilet 10 can be improved.

The supply controller 45 transmits, to the open/close controller 48, the command signal of the flush water supply determiner 47 that it is impossible to supply the flush water W. When receiving the command signal that it is impossible to supply the flush water W, the open/close controller 48 prohibits the open operation of the flush water supplier 30, even when receiving a command signal of the toilet flush from the user.

The state in which the flush water W is caused to flow in the bowl 11 of the flush toilet 10 will now be described.

Figure 4:
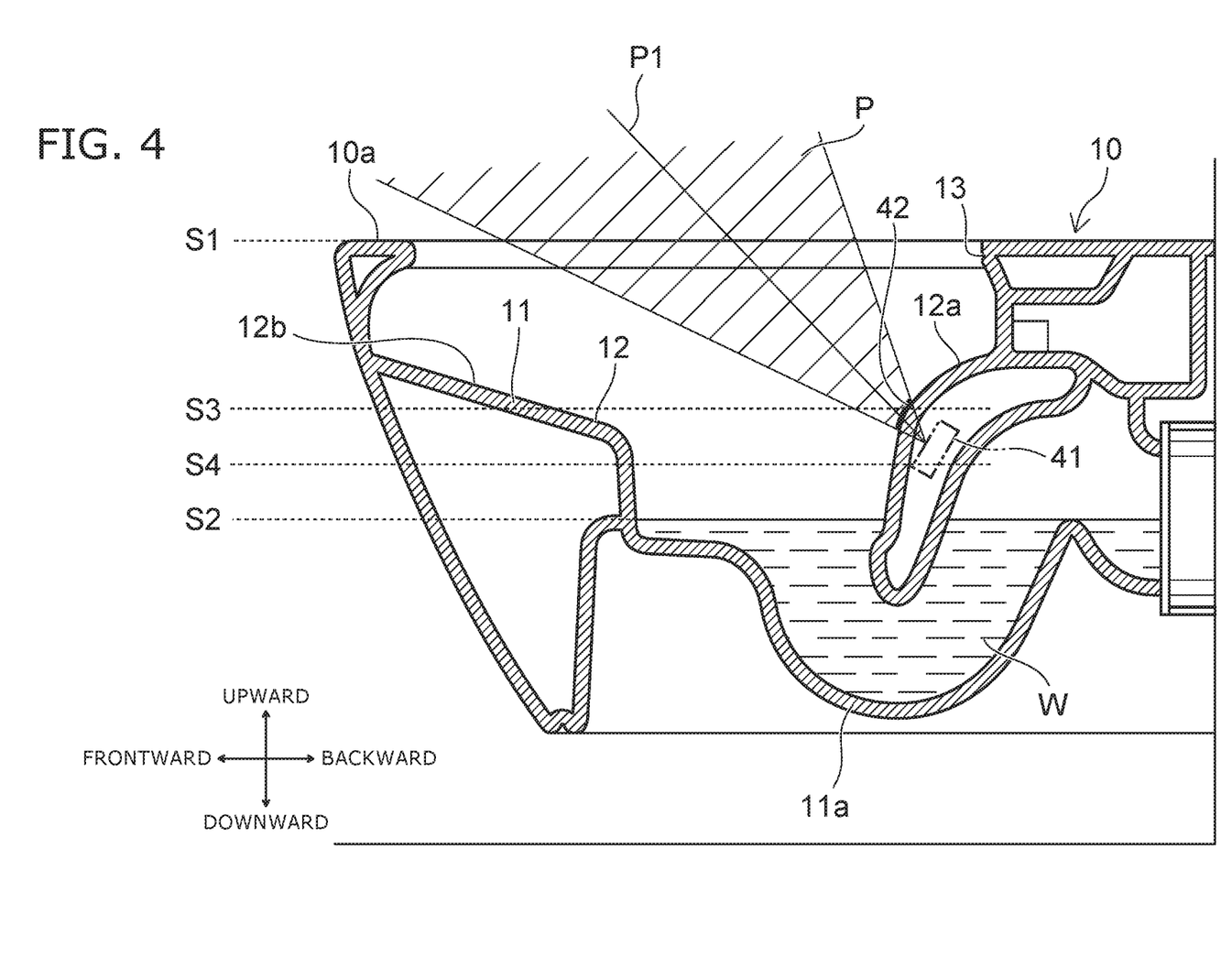
FIG. 4 is a cross-sectional view schematically showing the detection state of the detector when the flush toilet is not clogged.

FIG. 4 is a cross-sectional view schematically showing the detection state of the detector when the flush toilet is not clogged.

Figure 5:
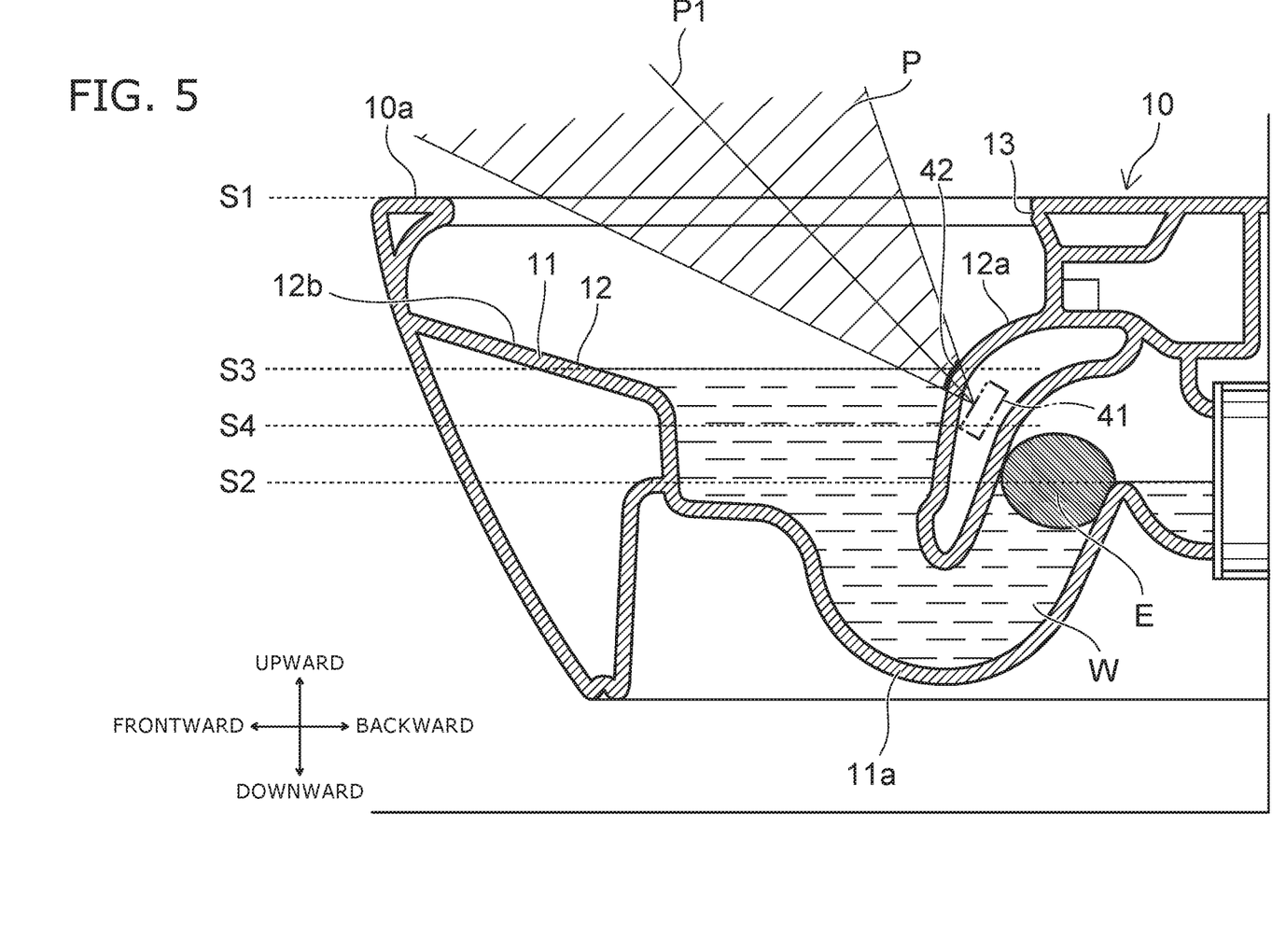
FIG. 5 is a cross-sectional view schematically showing the detection state of the detector when the flush toilet is clogged.

FIG. 5 is a cross-sectional view schematically showing the detection state of the detector when the flush toilet is clogged.

First, as shown in FIG. 2A, the flush water W is discharged from the first water discharge port 24a and the second water discharge port 25a of the flow channel 20 toward the surface 12 of the bowl 11 when the flush water supplier 30 is switched to the open state. Thereby, the surface 12 of the bowl 11 can be washed by the flush water W spreading over the entire surface 12 of the bowl 11.

Then, when the flush water supplier 30 is switched from the open state to the closed state, the flush water W that remains in the flow channel 20 at the downstream side of the flush water supplier 30 is discharged into the bowl 11. In such a case, at the surface 12 of the bowl 11 as shown in FIG. 2B, the flush water W flows into the bottom portion 11a of the bowl 11 with a low swirling rate because the flow rate and the flow velocity of the flush water W discharged from the first water discharge port 24a and the second water discharge port 25a are reduced.

Subsequently, as shown in FIG. 3A and FIG. 3B, the flow rate and the flow velocity of the flush water W gradually decrease, and the flush water W flows in the vertical direction from the first water discharge port 24a and the second water discharge port 25a toward the bottom portion 11a of the bowl 11. In other words, the flush water W trickles down from the first water discharge port 24a and the second water discharge port 25a toward the bottom portion 11a of the bowl 11. Then, the flush water W is in an accumulated state at the bottom portion 11a of the bowl 11 when the discharging of the flush water W from the first water discharge port 24a and the second water discharge port 25a ends.

As shown in FIG. 4, the position of the water surface of the water (the seal water) inside the flush toilet 10 is the seal level S2 in the normal state in which the flush toilet 10 is not clogged. On the other hand, as shown in FIG. 5, when foreign matter E clogs the flush toilet 10, the flush water W does not flow; therefore, the position of the water surface inside the flush toilet 10 becomes a critical level S3 that is higher than the seal level S2 and lower than the full level S1. Accordingly, even when clogged with the foreign matter E, the supply of one flush amount of the flush water W will not cause the flush water W to overflow from the bowl 11. In other words, the critical level S3 is positioned between the seal level S2 and the full level S1 and is the level of the surface of the flush water W accumulated in the bowl 11 when the flush toilet 10 is clogged. In such a case, the critical level S3 is the position from which the full level S1 is reached when one flush amount of the flush water W for flushing feces is supplied. In other words, the critical level S3 is the position of one flush amount of the flush water W for flushing feces subtracted from the full level S1. In other words, when the flush water W is at the critical level S3, the flush water W accumulates to the full level S1 when one flush amount of the flush water W for flushing feces is supplied. The detector 41 detects the flush water W positioned between the seal level S2 and the critical level S3.

The detection region 42 of the surface 12 of the bowl 11 by the detector 41 will now be described. As shown in FIG. 3A, the detection region 42 is set to a portion of a detectable region 420.

The detection region 42 is set to the detectable region 420 of the surface 12 of the bowl 11 where the effects of the flush water W flowing over the surface 12 of the bowl 11 after the flush water supplier 30 is switched from the open state to the closed state are low. In other words, the detection region 42 is set to one portion of the detectable region 420 of the surface 12 of the bowl 11 that is separated from the path of the flush water W early after the flush water supplier 30 is closed.

Specifically, as shown in FIG. 3A, the detection region 42 of the detector 41 can be set to a position of the surface 12 of the bowl 11 that is separated from the flush water W flowing in the vertical direction from the water discharge ports (the first water discharge port 24a and the second water discharge port 25a) of the flow channel 20 toward the bottom portion 11a of the bowl 11 after the flush water supplier 30 is closed. In such a case, for example, the flush water W that outflows from the first water discharge port 24a and the second water discharge port 25a flows down with a width A that is not less than 1 cm and not more than 6 cm (1 cm A 6 cm).

In other words, the detection region 42 of the detector 41 can be set to a position of the surface 12 of the bowl 11 that is separated from the flush water W flowing from the water discharge ports (the first water discharge port 24a and the second water discharge port 25a) of the flow channel 20 toward the bottom portion 11a of the bowl 11 at an arbitrary number of seconds not less than 4 seconds and not more than 12 seconds from when the flush water supplier 30 is closed. The arbitrary number of seconds can be set by experiment or simulation based on the specification of the flush toilet 10, the specification of the flush water passageway 22, the supply amount of the flush water W, etc., and favorably is 10 seconds from when the flush water supplier 30 is closed, or more favorably 5 seconds from when the flush water supplier 30 is closed. In other words, for flush toilets 10 having different specifications, it is favorable for the arbitrary number of seconds to be set to the lowest possible number of seconds so that the detection region 42 is such that the detector 41 does not misdetect the flush water W flowing from the water discharge ports toward the bottom portion 11a of the bowl 11. The detector 41 is disposed in the flush toilet 10 so that such a detection region 42 can be satisfied.

Thereby, the supply controller 45 can set an earlier start timing of the determination of the clog detection. In other words, by setting the detection region 42 of the detector 41 to be a portion where the effects of the flush water W are low, the supply controller 45 can perform the clog determination even while the flush water W is flowing. As a result, the ease of use of the flush toilet 10 can be improved because the supply controller 45 can end the clog determination early.

It is favorable to set the detection region 42 of the detector 41 backward of a longitudinal-direction center O1-O1 of the bowl 11. In such a case, as shown in FIG. 1 and FIG. 3A, the center O1-O1 can be taken to be the center of a length L in the longitudinal direction of the opening 13 of the bowl 11. Here, the back side 12a of the bowl 11 is more vertically erect than the front side 12b. Thereby, the flush water W that flows over the surface 12 of the bowl 11 flows down to the bottom portion 11a earlier at the back side 12a than at the front side 12b. Accordingly, the clog determination can be performed earlier by setting the detection region 42 of the detector 41 to a portion of a first portion 421 or a second portion 422 backward of the longitudinal-direction center O1-O1 of the bowl 11.

Also, it is favorable to set the detection region 42 of the detector 41 sideward of a lateral-direction center O2-O2 of the bowl 11. In such a case, as shown in FIG. 3A, the center O2-O2 can be taken to be the lateral-direction center of the opening 13 of the bowl 11. In such a case, the detection region 42 of the detector 41 is offset from the center O2-O2 in the lateral direction by a dimension B. For example, excrement (waste) adheres easily at the central portion of the back side 12a of the bowl 11. Therefore, the misdetection by the detector 41 can be suppressed by separating the detection region 42 of the detector 41 from the center O2-O2 where excrement including moisture easily adheres.

Also, it is favorable for the detection region 42 of the detector 41 to be set to an intermediate section between the first water discharge port 24a and the second water discharge port 25a in the circumferential direction. In other words, as shown in FIG. 3A, the circumferential-direction dimensions to the detection region 42 of the detector 41 from the first water discharge port 24a and the second water discharge port 25a are the same dimension C. Thereby, the detection region 42 of the detector 41 is at a position where the effects of the flush water W outflowing from the first water discharge port 24a and the second water discharge port 25a into the bowl 11 can be eliminated early. Accordingly, the detector 41 can perform the detection of the clog determination efficiently after flushing the flush toilet 10. Although the detection region 42 of the detector 41 is at the back side 12a of the bowl 11 in the example of FIG. 3A, the detection region is not limited thereto; for example, a detection region 42a of the detector 41 may be set at the front side 12b of the bowl 11 as shown in FIG. 3B. In such a case, it is favorable for the circumferential-direction dimensions to the detection region 42a from the first water discharge port 24a and the second water discharge port 25a to be the same dimension D.

The orientation in the vertical direction of the radio wave P radiated by the detector 41 will now be described.

As shown in FIG. 4 and FIG. 5, the detector 41 forms the detection region 42 at the back side 12a of the bowl 11 by irradiating the radio wave P obliquely upward. In such a case, a center P1 of the detection region 42 of the detector 41 is positioned higher than a central position S4 between the seal level S2 and the critical level S3. Specifically, the center P1 of the detection region 42 of the detector 41 is positioned between the central position S4 and the critical level S3 at the back side of the surface 12 of the bowl 11. The center P1 is the maximum beam direction at which the intensity of the radio wave P has a maximum in the detection region 42 of the detector 41. For example, the detector 41 is disposed in the flush toilet 10 so that the radiating part that radiates the radio wave P is positioned higher than the central position S4. Thereby, the center P1 of the radio wave P can be positioned higher than the central position S4 at the surface 12 of the bowl 11.

There are cases where the surface 12 of the bowl 11 is hydrophilic. In such a case, there is a risk that the flush water W may gradually wet and spread as the flush water W flows down over the surface 12 of the bowl 11 toward the bottom portion 11a. Therefore, the effects of the flush water W spreading can be reduced by setting the center P1 of the detection region 42 of the detector 41 to a high position (at the critical level S3) before the flush water W begins to wet and spread. Accordingly, a misdetection by the detector 41 due to the flush water W spreading can be suppressed.

The change of the detection state by the detector 41 over time will now be described.

Figure 6A:
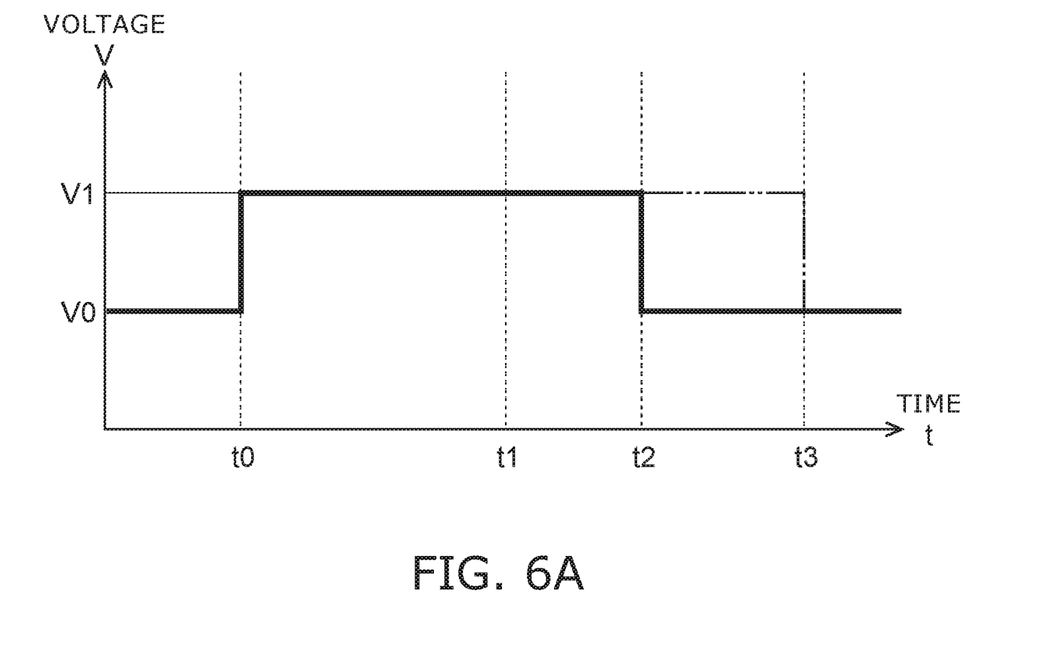
FIG. 6A is a characteristic diagram illustrating the detection result of the detector when the flush toilet is not clogged.

FIG. 6A is a characteristic diagram illustrating the detection result of the detector when the flush toilet is not clogged.

First, at a time t0 as shown in FIG. 6A, the flush water supplier 30 is switched from the closed state to the open state by a toilet flush operation by the user. Thereby, the flush water W flows over the surface 12 of the bowl 11 from the first water discharge port 24a and the second water discharge port 25a. At this time, a voltage V0 changes to a voltage V1 because the detector 41 can detect the flush water W in the detection region 42.

At a next time t1, the flush water supplier 30 is switched from the open state to the closed state to end the supply of the flush water W to the bowl 11. The supply controller 45 prohibits the open operation of the flush water supplier 30 from the time t1 when the flush water supplier 30 is closed until the determination of the clog state of the flush toilet 10 ends. Then, from the time t1 to a time t2, the flush water W that is in the flow channel 20 at the downstream side of the flush water supplier 30 flows over the detection region 42 of the bowl 11. Accordingly, the detector 41 detects the flush water W, and the voltage V1 is continued.

The flush water W that flows over the surface 12 of the bowl 11 separates from the detection region 42 at the time t2. Thereby, the detector 41 switches from the voltage V1 to the voltage V0. The time from the time t1 to the time t2 is set according to the specification of the flush toilet 10, is set to an arbitrary number of seconds between 4 and 12 seconds, and is, for example, 10 seconds. The clog determiner 46 of the supply controller 45 starts the clog determination at the time t2. At this time, the flush water W flows in the vertical direction from the first water discharge port 24a and the second water discharge port 25a toward the bottom portion 11a at positions separated from the detection region 42 of the surface 12 of the bowl 11.

Here, as shown by the double dot-dash line in FIG. 6A, for example, when the detection region 42 of the detector 41 is at the position of the flush water W flowing in the vertical direction from the first water discharge port 24a toward the bottom portion 11a, the detector 41 detects the flush water W even at the time t2, and the voltage V1 is maintained. Then, the detector 41 is switched from the voltage V1 to the voltage V0 at a time t3 at which the flush water W no longer flows down in the vertical direction from the first water discharge port 24a and the second water discharge port 25a toward the bottom portion 11a.

In the embodiment, the detection region 42 of the detector 41 is set to a portion of the surface 12 of the bowl 11 where the flush water W disappears as early as possible. Accordingly, the supply controller 45 can perform the clog determination of the flush toilet 10 early. Thereby, the ease of use of the flush toilet 10 can be improved because the clog determination of the flush toilet 10 can end early. In other words, for example, a discrepancy in which the next user cannot flush the flush toilet 10 because the supply controller 45 is performing the clog determination can be suppressed.

Figure 6B:
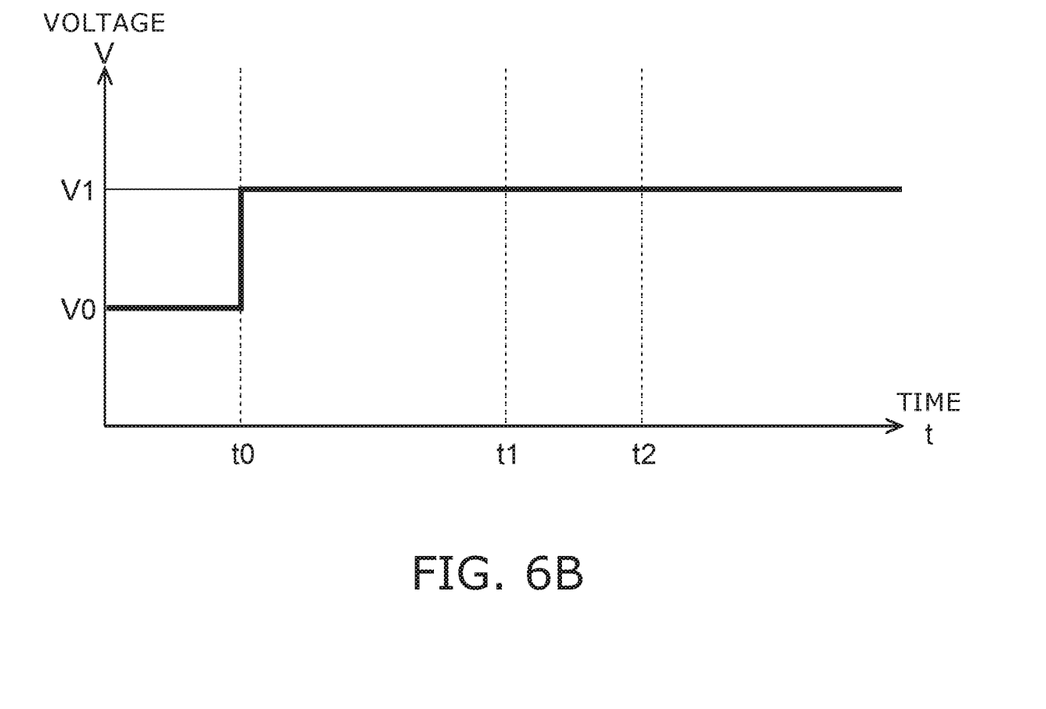
FIG. 6B is a characteristic diagram illustrating the detection result of the detector when the flush toilet is clogged.

FIG. 6B is a characteristic diagram illustrating the detection result of the detector when the flush toilet is clogged.

When the foreign matter E clogs the flush toilet 10 as shown in FIG. 5, the water surface of the flush water W rises to the critical level S3 of the bowl 11. Accordingly, as shown in FIG. 6B, the detector 41 continues to maintain the voltage V1 even at the time t2 when the clog determiner 46 starts the clog determination. Thereby, the clog determiner 46 of the supply controller 45 can determine that clogging of the flush toilet 10 has occurred.

Figure 7:
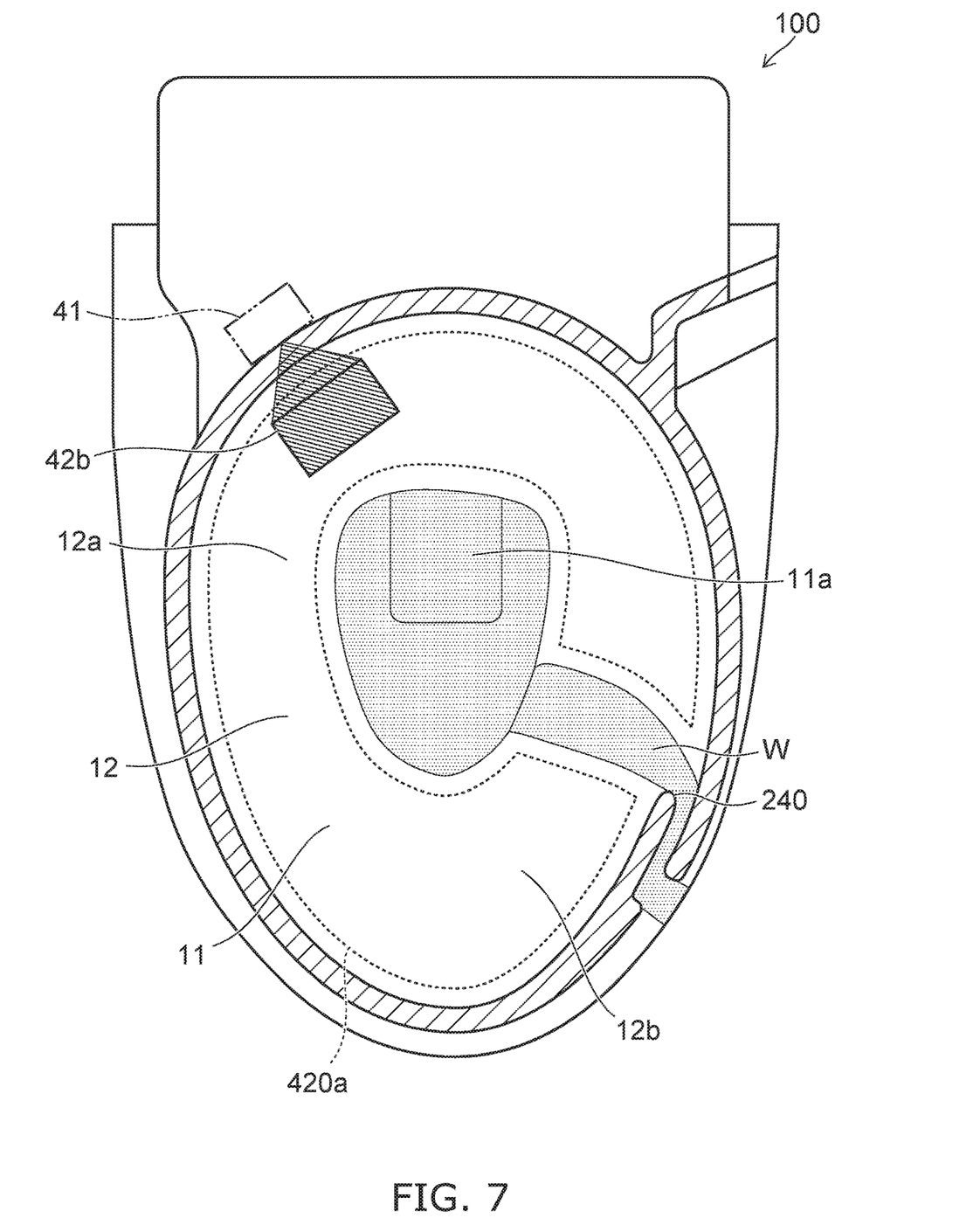
FIG. 7 is a cross-sectional view similar to FIG. 3A showing a flush toilet according to a first modification of the invention that has one water discharge port.

FIG. 7 is a cross-sectional view similar to FIG. 3A showing a flush toilet according to a first modification of the invention that has one water discharge port.

In the example described in the embodiment, the flush toilet 10 has the two water discharge ports of the first water discharge port 24a and the second water discharge port 25a. However, the invention is not limited thereto; for example, as in the first modification shown in FIG. 7, the flush toilet 100 may have one water discharge port 240. In other words, positions that are separated from the flush water W flowing in the vertical direction from the water discharge port 240 are in a detectable region 420a. Then, a detection region 42b of the detector 41 may be set in the detectable region 420a.

Figure 8:
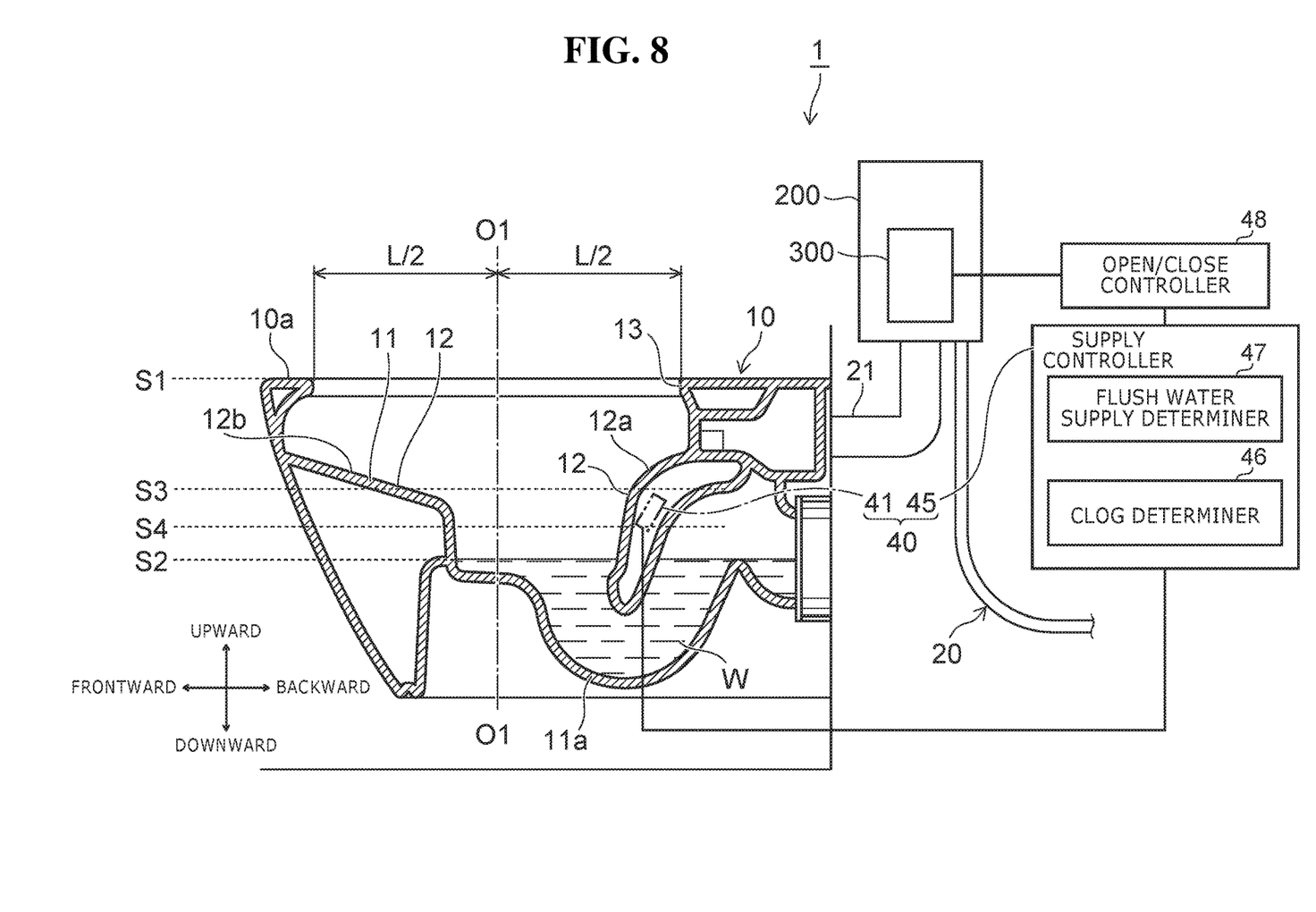
FIG. 8 is a schematic view showing a configuration of a tank-type toilet system according to a second modification of the invention.

FIG. 8 is a schematic view showing a configuration of a tank-type toilet system according to a second modification of the invention.

In the example described in the embodiment, the flush water supplier 30 is a flush valve provided in the water supply pipe line 21. However, the invention is not limited thereto; for example, as in the second modification shown in FIG. 7, a flush water supplier 300 may include a flapper valve provided inside a tank 200.

For example, the aspects described below may be considered as toilet devices and toilet systems based on the embodiments described above.

A first aspect includes a detector detecting whether or not flush water is at a position lower than a full level and higher than a seal level at a surface of a bowl of a flush toilet, and a controller determining a clog state of the flush toilet based on a detection result of the detector after a flush water supplier is closed; the flush water supplier is located in a flow channel discharging flush water into the bowl; and a position of a detection region of the detector at the surface of the bowl is separated from flush water flowing in a vertical direction from a water discharge port of the flow channel toward a bottom portion of the bowl after the flush water supplier is closed.

According to the first aspect, the controller can set the start timing of the determination of the clog detection to be earlier. Because the start timing of the clog determination is set to be earlier, the end timing of the clog detection also can be earlier. As a result, the ease of use of the flush toilet can be improved because the determination of whether or not the flush toilet is clogged can be performed early.

A second aspect includes a detector detecting whether or not flush water is at a position lower than a full level and higher than a seal level at a surface of a bowl of a flush toilet, and a controller determining a clog state of the flush toilet based on a detection result of the detector after a flush water supplier is closed; the flush water supplier is located in a flow channel discharging flush water into the bowl; and a position of a detection region of the detector at the surface of the bowl is separated from flush water flowing from a water discharge port of the flow channel toward a bottom portion of the bowl at an arbitrary number of seconds not less than 4 seconds and not more than 12 seconds from when the flush water supplier is closed.

According to the second aspect, the controller can set the start timing of the determination of the clog detection to be earlier. Because the start timing of the clog determination is set to be earlier, the end timing of the clog detection also can be earlier. In other words, for example, the detection region is set to a position that is separated from the flush water flowing over the surface of the bowl 10 seconds from when the flush water supplier is closed. Accordingly, the ease of use of the flush toilet can be improved because the determination of whether or not the flush toilet is clogged can be performed early.

A third aspect is the first or second aspect, wherein the detection region of the detector is backward of a longitudinal-direction center of the bowl.

Generally, the shape of the bowl is such that the back side is more vertical than the front side. As a result, it is easy for the flush water to fall earlier at the back side than at the front side. According to the third aspect, the timing of the start of the clog determination can be earlier because the detector is disposed at the back side of the bowl where the flush water disappears early. By setting the start timing of the clog determination to be earlier, the clog determination end timing also can be earlier. Accordingly, the ease of use of the flush toilet can be improved.

A fourth aspect is the third aspect, wherein the detection region of the detector is sideward of a lateral-direction center of the bowl.

Waste (excrement) adheres easily to the central portion of the back of the bowl. Because the waste includes moisture, when the waste is adhered to the surface of the bowl, there is a risk of a misdetection by the detector if water exists. Therefore, according to the fourth aspect, the misdetection by the detector can be suppressed by shifting the detection region of the detector in the lateral direction at the back of the bowl so that the waste does not adhere easily.

A fifth aspect is any one of the first to fourth aspects, wherein: the water discharge port of the flow channel includes a first water discharge port discharging flush water along the surface of the bowl, and a second water discharge port separated from the first water discharge port in a circumferential direction; the second water discharge port discharges flush water along the surface of the bowl; and the detection region of the detector is at an intermediate section between the first water discharge port and the second water discharge port in the circumferential direction.

According to the fifth aspect, by providing the detection region of the detector at the intermediate section between the first water discharge port and the second water discharge port, the flush water that flows over the surface of the bowl can be avoided efficiently. Accordingly, even when the detector is mounted to a flush toilet having multiple water discharge ports, the start timing of the clog determination can be earlier, and the end timing of the clog determination also can be earlier. As a result, the ease of use of the flush toilet can be improved.

A sixth aspect is any one of the first to fifth aspects, wherein a critical level is positioned between the seal level and the full level and is a level to which flush water accumulates in the bowl when the flush toilet is clogged, the critical level is a level from which the full level is reached when one flush amount of flush water for flushing feces is supplied, and a center of the detection region of the detector is positioned higher than a central position between the seal level and the critical level.

There is a risk that the flush water flowing from the water discharge port may wet and spread gradually due to a hydrophilic property when flowing down over the bowl. Therefore, even when the detection region of the detector is disposed at a position separated from the water discharge port, there is a possibility that the flush water that wets and spreads may pass through the periphery of the detection region. Therefore, according to the sixth aspect, the flush water that passes through the periphery of the detection region can be suppressed by setting the detection region of the detector to be at a relatively high position before the flush water starts to wet and spread. As a result, the misdetection by the detector can be suppressed.

A seventh aspect is any one of the first to sixth aspects, wherein the controller prohibits an open operation of the flush water supplier from when the flush water supplier is closed until the determining of the clog state of the flush toilet ends.

According to the seventh aspect, the overflow of flush water from the flush toilet when determining the clog state can be suppressed. Also, the start timing of the clog determination can be early; therefore, the supply prohibition time of the flush water can be short, and the flush toilet can be usable early when the flush toilet is not clogged. As a result, a flush toilet that is easy to use can be provided.

A toilet system according to an eighth aspect includes a flush toilet including a bowl, a flush water supplier supplying flush water to the bowl, and the toilet device according to any one of the first to seventh aspects.

According to the eighth aspect, the toilet system can set the start timing of the determination of the clog detection to be earlier. By setting the start timing of the clog determination to be earlier, the end timing of the clog detection also can be earlier. Accordingly, the determination of whether or not the flush toilet is clogged can be early; therefore, a toilet system that is easy to use can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. For example, the shape, the dimension, the material, the disposition, the installation feature or the like of the components included in the toilet system 1 and the toilet device 40 are not limited to the illustration and can be appropriately modified. The components included in the embodiments described above can be combined within the extent of technical feasibility, and any combined components also are included in the scope of the invention to the extent that the feature of the invention is included.

What is claimed is:

1. A toilet device, comprising:
   a detector detecting whether or not flush water is at a position lower than a full level and higher than a seal level at a surface of a bowl of a flush toilet; and
   a controller determining a clog state of the flush toilet based on a detection result of the detector after a flush water supplier is closed, the flush water supplier being located in a flow channel discharging flush water into the bowl,
   a position of a detection region of the detector at the surface of the bowl being separated from flush water flowing in a vertical direction from a water discharge port of the flow channel toward a bottom portion of the bowl after the flush water supplier is closed.

2. A toilet device, comprising:
   a detector detecting whether or not flush water is at a position lower than a full level and higher than a seal level at a surface of a bowl of a flush toilet; and
   a controller determining a clog state of the flush toilet based on a detection result of the detector after a flush water supplier is closed, the flush water supplier being located in a flow channel discharging flush water into the bowl,
   a position of a detection region of the detector at the surface of the bowl being separated from flush water flowing from a water discharge port of the flow channel toward a bottom portion of the bowl at an arbitrary number of seconds not less than 4 seconds and not more than 12 seconds from when the flush water supplier is closed.

3. The device according to claim 1, wherein
   the detection region of the detector is backward of a longitudinal-direction center of the bowl.

4. The device according to claim 3, wherein
   the detection region of the detector is sideward of a lateral-direction center of the bowl.

5. The device according to claim 1, wherein
the water discharge port of the flow channel includes a first water discharge port discharging flush water along the surface of the bowl, and a second water discharge port that is separated from the first water discharge port in a circumferential direction and discharges flush water along the surface of the bowl, and
the detection region of the detector is at an intermediate section between the first water discharge port and the second water discharge port in the circumferential direction.

6. The device according to claim 1, wherein
the device includes a critical level positioned between the seal level and the full level, the critical level being a level to which flush water accumulates in the bowl when the flush toilet is clogged,
the critical level is a level from which the full level is reached when one flush amount of flush water for flushing feces is supplied, and
a center of the detection region of the detector is positioned higher than a central position between the seal level and the critical level.

7. The device according to claim 1, wherein
the controller prohibits an open operation of the flush water supplier from when the flush water supplier is closed until the determining of the clog state of the flush toilet ends.

8. A toilet system, comprising:
a flush toilet including a bowl;
a flush water supplier supplying flush water to the bowl; and
the toilet device according to claim 1.

9. The device according to claim 4, wherein
the water discharge port of the flow channel includes a first water discharge port discharging flush water along the surface of the bowl, and a second water discharge port that is separated from the first water discharge port in a circumferential direction and discharges flush water along the surface of the bowl, and
the detection region of the detector is at an intermediate section between the first water discharge port and the second water discharge port in the circumferential direction.

10. The device according to claim 9, wherein
the device includes a critical level positioned between the seal level and the full level, the critical level being a level to which flush water accumulates in the bowl when the flush toilet is clogged,
the critical level is a level from which the full level is reached when one flush amount of flush water for flushing feces is supplied, and
a center of the detection region of the detector is positioned higher than a central position between the seal level and the critical level.

11. The device according to claim 10, wherein
the controller prohibits an open operation of the flush water supplier from when the flush water supplier is closed until the determining of the clog state of the flush toilet ends.

12. A toilet system, comprising:
a flush toilet including a bowl;
a flush water supplier supplying flush water to the bowl; and
the toilet device according to claim 11.

13. The device according to claim 2, wherein
the detection region of the detector is backward of a longitudinal-direction center of the bowl.

14. The device according to claim 13, wherein
the detection region of the detector is sideward of a lateral-direction center of the bowl.

15. The device according to claim 2, wherein
the water discharge port of the flow channel includes a first water discharge port discharging flush water along the surface of the bowl, and a second water discharge port that is separated from the first water discharge port in a circumferential direction and discharges flush water along the surface of the bowl, and
the detection region of the detector is at an intermediate section between the first water discharge port and the second water discharge port in the circumferential direction.

16. The device according to claim 2, wherein
the device includes a critical level positioned between the seal level and the full level, the critical level being a level to which flush water accumulates in the bowl when the flush toilet is clogged,
the critical level is a level from which the full level is reached when one flush amount of flush water for flushing feces is supplied, and
a center of the detection region of the detector is positioned higher than a central position between the seal level and the critical level.

17. The device according to claim 2, wherein
the controller prohibits an open operation of the flush water supplier from when the flush water supplier is closed until the determining of the clog state of the flush toilet ends.

18. A toilet system, comprising:
a flush toilet including a bowl;
a flush water supplier supplying flush water to the bowl; and
the toilet device according to claim 2.

19. The device according to claim 14, wherein
the water discharge port of the flow channel includes a first water discharge port discharging flush water along the surface of the bowl, and a second water discharge port that is separated from the first water discharge port in a circumferential direction and discharges flush water along the surface of the bowl, and
the detection region of the detector is at an intermediate section between the first water discharge port and the second water discharge port in the circumferential direction.

20. The device according to claim 19, wherein
the device includes a critical level positioned between the seal level and the full level, the critical level being a level to which flush water accumulates in the bowl when the flush toilet is clogged,
the critical level is a level from which the full level is reached when one flush amount of flush water for flushing feces is supplied, and
a center of the detection region of the detector is positioned higher than a central position between the seal level and the critical level.

* * * * *